United States Patent Office 3,547,929
Patented Dec. 15, 1970

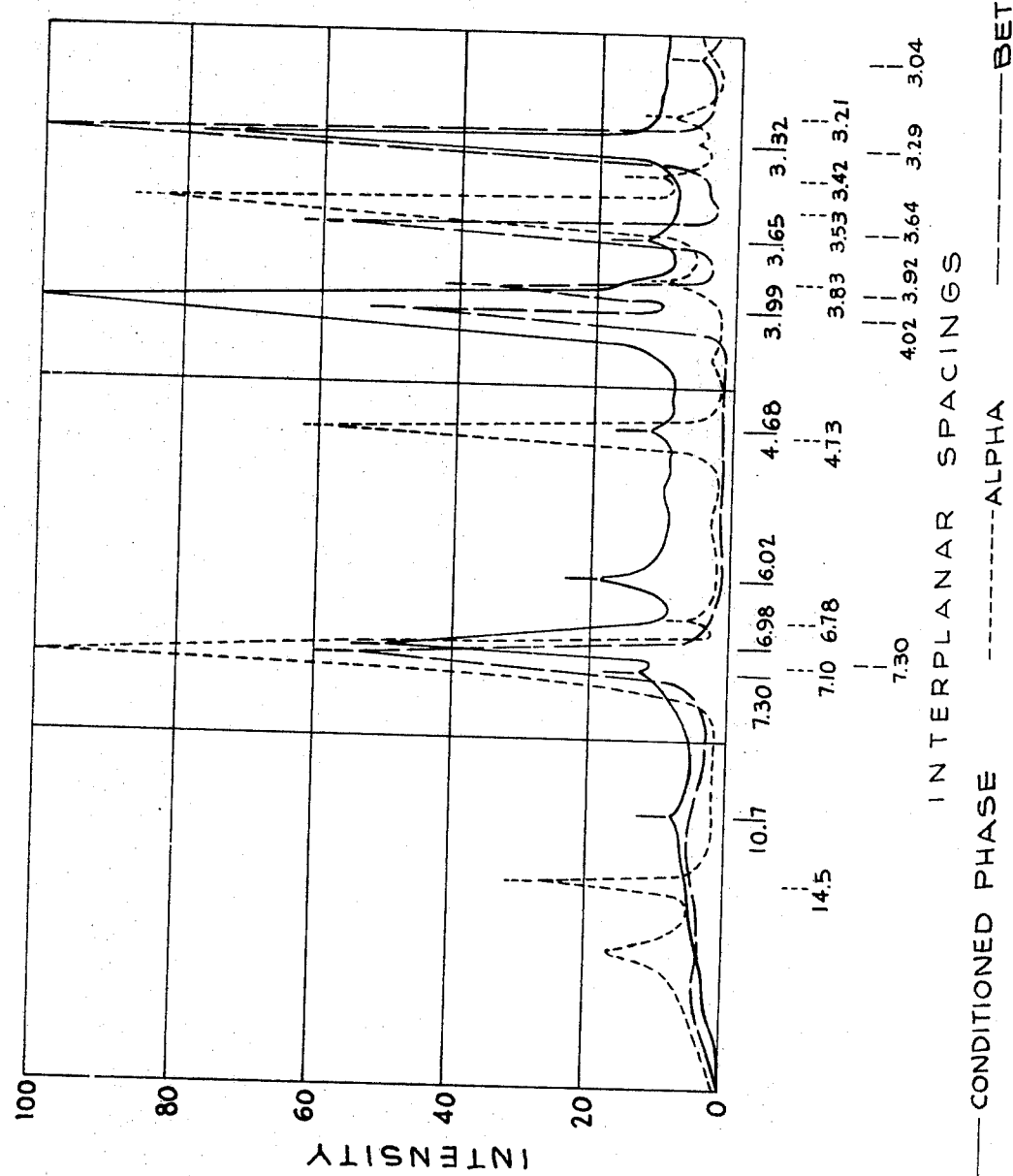

3,547,929
4,11-DICHLOROQUINACRIDONE PIGMENTS
Anthony P. Wagener, Park Forest, and George J. Meisters, Chicago, Ill., assignors to The Sherwin-Williams Company, Cleveland, Ohio, a corporation of Ohio
Filed Aug. 7, 1967, Ser. No. 658,891
Int. Cl. C07d 39/00
U.S. Cl. 260—279
9 Claims

ABSTRACT OF THE DISCLOSURE

This invention comprises a new 4,11-dichloroquinacridone pigment and the method of preparing said pigment by milling the crude compound with a solid, soluble inorganic salt and dimethyl formamide at approximately 20–60° C. This new phase of the compound is distinguished by its scarlet orange color and characteristic X-ray diffraction pattern. This product has an X-ray diffraction pattern having lines of strong intensity at interplanar spacings of 3.99 and 3.32 Angstrom units, a line of intermediate intensity at 6.98 A., and weak lines at 10.70, 7.30, 6.02, 4.68 and 3.65 A. Its scarlet orange color is characterized by a dominant wave length of 608.5, a light purity of 88.8%, and a reflectance or Y value of 12.23 at 100% pigment.

This application relates to a new 4,11-dichloroquinacridone pigment. More specifically, it relates to a particular 4,11-dichloroquinacridone pigment conditioned to give a distinctive scarlet shade orange color and to impart a characteristic X-ray diffraction pattern. Still more specifically, it relates to a process for preparing such pigments by conditioning the crude compound, containing a mixture of the alpha and beta forms, by the step of milling it with salt and dimethylformamide.

4,11-dichloroquinacridone is described in the patent literature, namely British Patent 896,916 (1962), Belgian Patent 618,873 (1962), U.S. Patent 3,085,023 (1963), and methods of preparation have also been disclosed, see U.S. Patent 3,107,248 (1963) and U.S. Patent 3,264,297 (1966). Two forms of this compound, namely alpha and beta, have been defined by X-ray diffraction spectra in U.S. Patent 3,160,510 (1964). The alpha has a very yellowish orange color and the beta is a very reddish orange.

This compound has the structural formula:

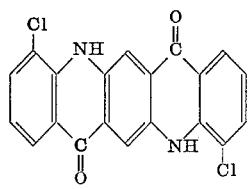

In accordance with the practice of this invention, it has now been found that the crude 4,11-dichloroquinacridone containing both the alpha and beta type, as obtained in the preparation of the compound, can be converted to a new scarlet shade of orange pigment having a new characteristic X-ray diffraction pattern by the steps of milling the compound with salt and dimethylformamide at 20–60° C., preferably room temperature to 50° C., and thereafter recovering the scarlet orange pigment product from the salt.

This new pigment has an X-ray diffraction pattern characterized by a line of strong intensity at interplanar spacings of 3.99 Angstrom units, a line of intermediate intensity at 6.98 A., and lines of weak intensity at 10.70, 7.30, 4.68 and 3.65 A. It has also a color defined by its tristimulus value as described hereinafter.

FIG. 1 represents graphically, the X-ray diffraction pattern of this compound in the form produced by the process of this invention, together with the corresponding curves for the alpha and beta phases of this compound.

In preparing the new phase of this compound described herein, the crude compound, containing 10–60% alpha and 90–40% beta, is milled with sodium chloride or other solid inorganic salt and dimethyl formamide.

The inorganic salt used in the process of this invention can be of various types. Obviously it must be stable against decomposition at the temperatures used for the grinding operation and should be soluble in water or dilute acid so as to be easily removable from the dichloroquinacridone. Advantageously it should be one not having water of hydration which will be liberated during the grinding process. Because of its inexpensiveness and availability, sodium chloride is preferred. However, other salts such as potassium chloride, ammonium chloride, ammonium sulfate, sodium sulfate, calcium carbonate, etc. can be used. These can be of commercial grade, and any adsorbed moisture present can be removed by preheating the salt separate from the quinacridone prior to its use.

The proportion of salt to pigment can be varied widely, ranging from 4 to 20 parts of salt per part of pigment. Very satisfactory results are obtained with about 9–10 parts of salt. Smaller amounts of salt require longer milling periods while larger amounts give no added advantage and therefore are less economical.

The proportion of dimethyl formamide is advantageously in the range of 20–30 parts per 100 parts of pigment, preferably about 20–25 parts; or 0.2–0.3 part, preferably 0.2–0.25 part per part of pigment.

Various types of mills can be used for the milling or grinding operation provided that they are equipped for maintaining the desired temperature. It is only necessary that in addition to maintaining the temperature, the mill provides the shearing or attrition necessary to produce the desired particle size. For example, a roller mill or an edge-runner mill or ball mill can be used. Various balls, rolls, nails, etc., are advantageously used in addition to the salt for producing the grinding effect. The grinding time will vary according to the particular type of mill and grinding material used.

It is generally found desirable to mill for at least 15–20 hours depending on the efficiency of the mills. For the laboratory size mills generally 24–72 hours is satisfactory, preferably about 48 hours. While no harm is done with excessive amounts of grinding, there is no added advantage in exceeding 72 hours.

While a temperature in the range of room temperature to 50° C. is preferred, it has been found that a temperature as high as 60° C. can be used in producing the new pigment of this invention.

The 4,11-dichloroquinacridone used for the purpose of this invention can be prepared by heating 2,5-bis(o-chloroanilino)terephthalic acid with an alkali metal hydrogen sulfate as described in U.S. Patent 3,107,248.

This product can also be prepared as a mixture of alpha and beta forms as described in U.S. Patent 3,160,510 by the conversion of 2,5-bis(o-chloroanilino)terephthalic acid in a manner similar to that described in U.S. Patent 3,264,297 for the preparation of quinacridone by the use of benzoyl chloride and nitrobenzene.

This invention is best illustrated by the following examples. These examples are given merely for purposes of illustration and are not intended in any way to restrict the scope of the invention or the manner in which it can be practiced. Unless specifically provided otherwise, parts and percentages are given in the examples and throughout the specification by weight.

EXAMPLE I

A mixture of 1000 g. of 2,5-bis(o-chloroanilino)terephthalic acid and 5000 cc. of nitrobenzene containing 1010 g. benzoyl chloride is stirred and heated gradually over a period of two hours up to a temperature of 190° C. The mixture is then stirred at 193–195° C. for 21 hours, then cooled to 150–120° C. and filtered. The orange product is washed with 2.5 liters of nitrobenzene at 100° C., and then with 3 liters of cold methanol, and dried with suction. The resultant filter cake is stirred for 1–2 hours in 3 liters of methanol and then filtered. The filtrate is again washed with 3 liters of methanol, dried with suction and then in an oven at 125° C. to constant weight. The 810 grams of reddish orange 4,11-dichloroquinacridone represents a yield of 89% of theoretical. X-ray diffraction analysis shows that this product contains about 55% of the alpha phase and 45% of the beta phase.

Repetition of the foregoing procedure shows a yield as high a 95% can be obtained and crudes can be prepared for the purpose of this invention in which the ratio of alpha to beta phase as determined by X-ray analysis varies from 10–60% alpha and 90–40% beta.

EXAMPLE II

In the following procedure a ball mill is used comprising a quart cylindrical steel jar charged with 2500 grams of ⅝ inch diameter steel balls or a mixture of 2250 grams of such balls and 250 grams of nails No. 6D, the nails being used to help prevent caking tendencies during milling. The cylindrical jar is 4.5 inches long and 5.5 inches in diameter. This jar is equipped with a lid having a suitable heat resistant gasket for sealing, preferably a silicone rubber gasket. It is rotated by rollers whose speed is adjusted so that the rate of rotation is 106 r.p.m. In each experiment, a charge of 20 grams of 4,11-dichloroquinacridone, 4.27 grams of dimethyl formamide and 180 grams of dried sodium chloride is used. In each case the sample and the salt together with the mill and grinding medium are stored overnight in a forced draft oven at 100–110° C. to remove any residual moisture that may be present. The mill is then charged with the sample and the salt, and the dimethylformamide is added just before the mill is sealed.

The milling is carried out for 48 hours at 50° C., the temperature being maintained by having the mill rolls and mill inside an oven maintained at the desired temperature. The charge remains free-flowing during the grinding operation. Upon completion of the milling, the contents of the mill are discharged dry, and separated from the steel balls by means of a coarse sieve. The fine milled solid has a scarlet orange color and weighs 200 grams. This product is dispersed by mixing in a Waring Blendor in 500 ml. of water for 5 minutes at full speed. The resultant slurry is transferred to a 3000 ml. beaker and agitated by means of a sweep type agitator. To this is added a solution of 70.4 grams of 98% sulfuric acid in 810 grams of water to yield a 5% acid concentration in the slurry. The resultant mixture is heated at 95–100° C. for 30 minutes after which the solids are filtered on a Buchner funnel and washed to neutrality. The resultant filter cake is dispersed in water by mixing in the Waring Blendor for three minutes in sufficient water to yield a fluid slurry. This slurry is returned to the beaker and water added until the volume is increased to 1300 ml. It is agitated and heated at 95–100° C. for 15 minutes after which the solids are filtered on a Buchner funnel and washed again with water. The filter cake thus obtained has a solids content of approximately 30% and is suitable for further processing as desired, i.e., flushing, preparation of dry colors, etc. The yield is 19.3 grams or 96.5% on a 100% solids basis.

Using the above procedure, three other samples of crude 4,11-dichloroquinacridone having approximately 75%, 50% and 25% of the alpha phase, with the balance in each case being the beta phase, are conditioned. In each of the four cases, the resultant pigment has the new scarlet orange shade and has a diffraction spectrum having interplanar spacings in Angstrom units as shown in the table below which also includes the X-ray diffraction spectra for the alpha and beta phases.

| Relative intensity | Alpha phase | Beta phase | New phase |
|---|---|---|---|
| Strong lines, A | 7.10 | 3.29 | 3.99 |
| | 3.53 | | 3.32 |
| | 4.73 | 7.30 | 6.98 |
| Intermediate lines | | 4.02 | |
| | | 3.92 | |
| | | 3.64 | |
| Weak lines | 14.50 | 3.04 | 10.70 |
| | 6.78 | | 7.30 |
| | 3.83 | | 6.02 |
| | 3.42 | | 4.68 |
| | 3.21 | | 3.65 |

The new scarlet orange color is analyzed by obtaining tristimulus data, Munsell renotations, the dominant wavelength, and the percent of purity for each sample. The tristimulus data are collected for three levels of pigmentation, namely 100%, 10% and 1% as diluted with ZnO white with the pigment in each case suspended in a varnish as colorless as possible so that it contributes no color. Two parts of varnish are used per part of pigment. These measurements are made by the use of a General Electric Recording Spectrophotometer with a Davidson Hemmendinger Tristimulus Integrator and using as the reference standard a pressed $BaSO_4$ which is manufactured by Bausch and Lomb, Inc.

The spectrophotometer is calibrated for wavelength reflectance level—100% line, and internal electronics before the samples are run. From the tristimulus output of the integrator, the chromaticity coordinates $x$ and $y$ are calculated by summing the tristimulus values and dividing this into tristimulus X and Y.

$$x = \frac{X}{X+Y+Z}$$
$$y = \frac{Y}{X+Y+Z}$$
$$Y = Y$$

The third variable Y is equal to tristimulus Y.

By using the chromatically coordinates in conjunction with a set of charts which were preperad by the Color Measurement Laboratory of the Agricultural Marking Administration, U.S.D.A., the Munsell Renotations are determined. The data for these charts is based on the "Final Report of the O.S.A. Subcommittee on the Spacing of the Munsell Colors," J. Opt. Soc. Am. 33, 1943.

By use of the book entitled "Handbook of Colorimetry" by Arthur C. Hardy; The Technology Press M.I.T., Cambridge, Mass., 1936, and these same chromatically coordinates, the percent purity and the dominant wavelength are determined.

The results obtained from such color analyses of the samples are shown below:

| | X | Y | Z |
|---|---|---|---|
| 100% 8.77R 4.04/15.12, 8.8% purity (light), 608.5 dom. wave.; $x=.6212$; $y=.3365$: | | | |
| 100% | 22.58 | 12.23 | 1.54 |
| 10% | 34.79 | 19.87 | 10.20 |
| 1% | 52.69 | 35.71 | 36.88 |

The color of this product is identified as having a dominant wavelength of 608.5, a light purity of 88.8%, and a reflectance or Y value of 12.23 at 100%.

EXAMPLE III

The procedure of Example II is repeated twice with similar results using temperatures of 25° C. and 40° C. respectively.

EXAMPLE IV

The procedure of Example II is repeated three times with results similar to Example II using 120 parts of potassium chloride, 150 parts ammonium chloride and 150 parts of sodium sulfate respectively.

EXAMPLE V

The procedure of Example II is repeated twice with results similar to Example II using 3.2 parts and 5.5 parts respectively of dimethyl formamide.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A 4,11-dichloroquinacridone pigment having a scarlet orange color and an X-ray diffraction pattern characterized by a line of strong intensity at an interplanar spacing of 3.99 Angstrom units, a line of intermediate intensity at 6.98 A., and weak lines at 10.70, 7.30, 4.68 and 3.65 A.

2. The process of preparing the pigment of claim 1 comprising the steps of salt milling a 4,11-dichloroquinacridone phase mixture consisting essentially of 10–60 percent by weight of the alpha form and 90–40 percent by weight of the beta form with a water-soluble, inorganic salt, thermally stable and solid at the temperature of said salt milling and selected from the class consisting of ammonium chloride, ammonium sulfate, and alkali metal and alkaline earth metal inorganic salts, and dimethyl formamide in an amount of 0.2–0.3 part by weight per part by weight of said phase mixture at a temperature in the range of 20–60° C. and thereafter separating said pigment from said salt.

3. The process of claim 2 in which said salt is sodium chloride.

4. The process of claim 3 in which said sodium chloride is used in an amount of 4–20 parts by weight per part by weight of said pigment.

5. The process of claim 4 in which said temperature is in the range of 20–50° C.

6. The process of claim 2 in which said salt is used in an amount of 4–20 parts per part of said crude and said temperature is 20–50° C.

7. The process of claim 6 in which said salt milling is conducted for a period of at least 15 hours.

8. The process of claim 2 in which said salt milling is conducted for a period of at least 15 hours.

9. A pigment of claim 1 in which the X-ray diffraction pattern has lines of strong intensity at interplanar spacings of 3.99 and 3.32 Angstrom units, a line of intermediate intensity at 6.98 Angstrom units, and lines of weaker intensity at 10.70, 7.30, 6.02, 4.68 and 3.65 Angstrom units.

References Cited

UNITED STATES PATENTS

| | | | |
|---|---|---|---|
| 2,982,666 | 5/1961 | Chun et al. | 260—279 |
| 3,121,718 | 2/1964 | Higgins | 260—270 |
| 2,844,581 | 7/1958 | Manger et al. | 260—279 |
| 3,007,930 | 11/1961 | Manger et al. | 260—279 |
| 3,030,370 | 4/1962 | Jackson | 260—279 |
| 3,148,191 | 9/1964 | Jackson et al. | 260—279 |
| 3,160,510 | 12/1964 | Ehrich | 260—279 |
| 3,298,847 | 1/1967 | Hanke et al. | 106—288 |
| 3,317,539 | 5/1967 | Jaffe | 260—279 |
| 3,351,481 | 11/1967 | Hopmeier et al. | 106—288 |

DONALD G. DAUS, Primary Examiner

U.S. Cl. X.R.

106—288; 260—518